United States Patent

Arai et al.

[11] Patent Number: 4,459,392
[45] Date of Patent: Jul. 10, 1984

[54] METHOD OF MAKING AND POLYMER OF HEAT RESISTANT POLYESTER USING DIGLYCIDILHYDANTOINS, DIGLYCIDILURACILS, DIGLYCIDILBARBITURIC AND ISOCYANURIC ACIDS

[75] Inventors: Yoshihiro Arai, Joyo; Takumi Tanaka, Uji, both of Japan

[73] Assignee: Unitika Limited, Osaka, Japan

[21] Appl. No.: 540,257

[22] Filed: Oct. 11, 1983

[30] Foreign Application Priority Data

Feb. 25, 1983 [JP] Japan .................................. 58-31411

[51] Int. Cl.$^3$ .............................................. C08G 63/76
[52] U.S. Cl. ..................................... 525/438; 528/288; 528/289; 528/297; 525/440
[58] Field of Search ................ 525/438, 440; 528/288, 528/289, 297

[56] References Cited

U.S. PATENT DOCUMENTS 3,937,751 2/1976 Schmid et al. .................. 528/289 X Primary Examiner—Lucille M. Phynes
Attorney, Agent, or Firm—Richard A. Anderson

[57] ABSTRACT

This invention is a polymer and a method of making heat resistant polyester characterized by reacting the polyester, consisting of aromatic dicarboxylic acid and the glycol component with 2-6 carbons, with 0.1-5 weight % of the bifunctional epoxy compound which is expressed by the following general formula (A) or (B):

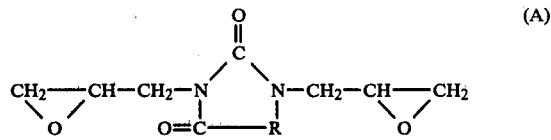

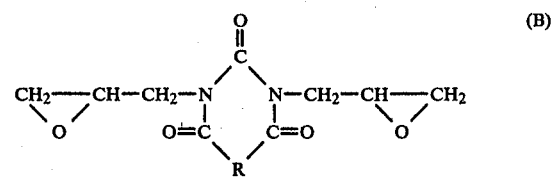

(R is a divalent organic group) and has 2 or 3 carbonyl groups adjacent to the nitrogen atom, to reduce the amount of the end carboxyl group to below 15 g equivalent/$10^6$ g polymer.

5 Claims, No Drawings

METHOD OF MAKING AND POLYMER OF HEAT RESISTANT POLYESTER USING DIGLYCIDILHYDANTOINS, DIGLYCIDILURACILS, DIGLYCIDILBARBITURIC AND ISOCYANURIC ACIDS

BACKGROUND OF THE INVENTION

This invention is related to a method of making the heat resistant polyester which has reduced amount of the end carboxyl group.

It is well known that in improving the heat resistance of polyester, i.e., the resistance to hydrolysis and resistance to aminolysis at high temperature, an effective method is to reduce the amount of the end carboxyl group (hereinafter this will be written as (COOH). Various methods have been proposed on reducing the (COOH) of polyester and, among them, the method of reacting the polyester with an epoxy compound is known as the typical example. However, study of this method has shown that the addition of epoxy compound would reduce (COOH) but there arise the problems such as the reduction in the degree of polymerization and insufficient reactivity of some epoxy compound with the (COOH) of polyester which results in an unsatisfactory effect.

SUMMARY OF THE INVENTION

It has been discovered that the reaction of polyester with the bifunctional compound which is expressed by the following general formula (A) or (B):

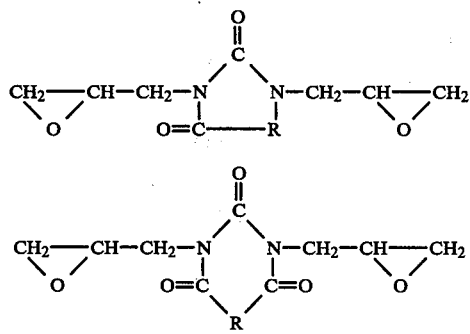

wherein R indicates a divalent organic group, and (A) or (B) has 2 or 3 carbonyl groups adjacent to the nitrogen atom is effective.

This invention is the method of making heat resistant polyester characterized by reacting the polyester, consisting of aromatic dicarboxylic acid and glycol component with 2-6 carbons, with 0.1-5 weight % of the bifunctional epoxy compound which is expressed by the above shown general formula (A) or (B), and has 2 or 3 carbonyl groups adjacent to the nitrogen atom to reduce the amount of (COOH) to below 15 g equivalents/$10^6$ g polymer.

In this invention, the polyester means the polycondensation product of aromatic dicarboxylic acid and the glycol with 2-6 carbons and there is no restriction as to the types. Also, we can use both the homopolymer and copolymer. As for the method of polyester polycondensation, we can use the known methods without modification.

As the specific examples of the bifunctional epoxy compound which is expressed by the above shown general formula (A) or (B), we can raise the following:
N,N'-diglycidilhydantoin;
N,N'-diglycidilbenzylidenehydantoin;
N,N'-diglycidil-5,5-diphenylhydantoin;
N,N'-diglycidilpentamethylenehydantoin;
N,N'-diglycidil-5-methyl-5-isobutylhydantoin;
N,N'-diglycidil-5-phenyl-5-ethylhydantoin;
N,N'-diglycidil-5,5-dimethylhydantoin;
N,N'-diglycidil-5-phenyl-5-methylhydantoin;
N,N'-diglycidilfurfurylidenehydantoin;
N,N'-diglycidil-7,8-benzo-5,5-pentamethylenehydantoin;
N,N'-diglycidiluracil;
N,N'-diglycidil-6-methyluracil;
N,N'-diglycidil-5-methyluracil;
N,N'-diglycidil-5-bromouracil;
N,N'-diglycidil-5-iodouracil;
N,N'-diglycidil-5-fluorouracil;
N,N'-diglycidilbarbituric acid;
N,N'-diglycidil-5-methylbarbituric acid;
N,N'-diglycidil-5-ethylbarbituric acid;
N,N'-diglycidil-5-n-butylbarbituric acid;
N,N'-diglycidil-5-isobutylbarbituric acid;
N,N'-diglycidil-5-phenylbarbituric acid;
N,N'-diglycidil-5-chlorobarbituric acid;
N,N'-diglycidil-5-bromobarbituric acid;
N,N'-diglycidil-5,5-dimethylbarbituric acid;
N,N'-diglycidil-5,5-diethylbarbituric acid;
N,N'-diglycidil-5,5-diphenylbarbituric acid;
N,N'-diglycidil-5-methylisocyanuric acid;
N,N'-diglycidil-5-ethylisocyanuric acid;
N,N'-diglycidil-5-n-butylisocyanuric acid;
N,N'-diglycidil-5-isobutylisocyanuric acid;
N,N'-diglycidil-5-phenylisocyanuric acid;
N,N'-diglycidil-5-chloroisocyanuric acid; and
N,N'-diglycidil-5-bromoisocyanuric acid.

These compounds can be synthesized by starting from the compounds in which —NH group is present in place of the N-glycidil group and substituting the hydrogen atom on the nitrogen atom with a glycidil group.

In other words, to the —NH group of the starting substance, epihalohydrin, particularly eipchlorohydrin or epibromohydrin, is reacted to introduce the glycidil group directly. This reaction can be carried out well by using a small amount of quaternary ammonium compound such as benzyltrimethylammonium chloride as the catalyst.

Such bifunctional epoxy compounds can be used alone or in a combination of two or more.

The amount of addition of the compound which is used in this invention and is expressed by the above shown general formula (A) or (B) is 0.1-5 weight % with respect to polyester. When this amount is too small, degree of blocking (COOH) is low; conversely, if it is too much, the pressure inside the extruder would rise abnormally making the spinning impossible although the reaction would proceed sufficiently.

Reaction of the polyester and the compound which is expressed by the above shown general formula (A) or (B) is carried out by adding the compound which is expressed by the above shown general formula (A) or (B) at the stage after the intrinsic viscosity of polyester reached 0.50; the reaction takes more than 3 minutes of time at the temperature which is normally above the melting point of the polyester. Here the intrinsic viscosity refers to the one which is measured at 20° C. by use of the mixed solvent of phenol/tetrachloroethane (1/1 weight ratio). At the time of reaction, it is naturally necessary that the atmosphere is filled with an inert gas such as nitrogen gas or the active gas which would accelerate the decomposition of polyester, such as oxygen, is blocked. The reaction should be carried out under stirring. The compound which is expressed by the above shown general formula (A) or (B) can be added and mixed before the completion of the polycondensation of polyester. But one can also adopt the method in which it is added and mixed to the polyester in the molten state after the completion of polymerization and before the melt spinning or the method in which it is mixed with pulverized solid polyester and then is let to react in melt spinning. The reaction proceeds without a catalyst, but one can also use a desirable catalyst.

By the addition of the compound which is expressed by the above shown general formula (A) or (B), (COOH) of the polyester is reduced effectively; at the same time, as the compound which is expressed by the above shown formula (A) or (B) is bifunctional, addition of this compound does not cause the reduction in the degree of polymerization; rather, the polyester chains are linked, resulting in a favorable rise in the degree of polymerization.

Thus, by reacting the polyester with 0.1–5 weight % of the compound which is expressed by the above shown general formula (A) or (B) to reduce the (COOH) to below 15 g equivalents/$10^6$ g polymer, improvement of the heat resistance is achieved.

In obtaining the polyester of this invention, one can, of course, add other additives to the polyester for other purposes.

Final form of the polyester of this invention can be fiber, film, and any other form.

The polyester in which (COOH) is reduced by the method of this invention has a very much improved heat resistance, i.e., the resistance to the hydrolysis or aminolysis at high temperature. Thus, its practical value improves by a great deal with the enhancement of performance in the conventional applications, the rationalization of processes, and the new possible applications to the areas where the material could not be used in the past.

In the following, we explain the invention in further details by use of the examples of applications.

EXAMPLES AND COMPARATIVE EXAMPLES

To the polyethyleneterephthalate chips which were obtained by the common method from terephthalic acid and ethylene glycol and had intrinsic viscosity of 0.73 and (COOH) of 24 g equivalents/$10^6$ g polymer, the epoxy compounds shown in Table 1 were added by the amount shown in Table 1 to blend. This was spun by use of a spinnerette die having 192 holes with a hole diameter of 0.5 mm. The spinning conditions were: temperature, 300° C.; residence time, 3–12 minutes; throughput, 300 g/min.; and wind up speed of 317 m/minute. The yarn obtained had 8520 d/192 f. The undrawn yarn obtained was drawn to a ratio of 3.8 at 90° C. in the first stage, and drawn to a ratio of 1.5 at 200° C. in the second stage. Then, it was heat treated under tension at 220° C. to obtain the drawn yarn of 1500 d/192 f finally. To the drawn yarn obtained, first a Z twist of 40T/10 cm was given; next, after joining two strands, an S twist of 40T/10 cm was given to obtain the greige cord of 1500 d×2. This griege cord was dipped in a one-bath type adhesive solution (Pexul (product of ICI Company)—RFL solution); then a tension of 1.0 kg/cord was applied and heat treatment was carrid out at 240° C. for 3 hours to obtain the treated cord. Next, in order to examine the heat resistance of the treated cord, the heat resistant strength was measured with the samples which were prepared under the vulcanization conditions of 170° C., 100 kg/cm$^2$, 60 minutes. Next, the adhesive force of the treated cord was evaluated by the H-test. First, the test piece was prepared by the vulcanization adhesion at 150° C., 100 kg/cm$^2$, 30 minutes and the adhesion force was measured. Properties of the drawn yarn and the treated cord are shown in Table 1.

Denacol EX-221 of Comparative Example 5 is a trade name (Nagase Sangyosha) of dibromoeopentylglycoldiglycidilether.

From the Examples of Application, 1–4 of Table 1 which satisfied the requirements of this invention, it is seen that the addition of epoxy compound reduced the (COOH), increased the intrinsic viscosity, improved the heat resistant strength and heat resistant strength retention and enhanced the adhesion force.

When the amount of addition of the epoxy compound was too small (Comparative Example 2), the effect was not sufficient; when it was too much (Comparative Example 3), polyester gelled and the pressure in the extruder rose abnormally, making the spinning impossible.

Comparative Examples 4 and 5 indicate the known examples. In Comparative Example 4, monofunctional epoxy compound was used and in Comparative Example 5, bifunctional epoxy compound was used. In each case, addition of the epoxy compound caused the reduction in intrinsic viscosity. In Comparative Example 5, reactivity of the epoxy compound and the (COOH) of polyester was lacking and the effect of reducing the (COOH) was not observed.

TABLE 1

| Example Number | Epoxy Compounds | | Drawn Yarn | | Treated Cord | | | |
|---|---|---|---|---|---|---|---|---|
| | Name of Compound | Amount of Addition, Weight % | Intrinsic Viscosity | (COOH) Grams Equivalent/ $10^6$ Grams | Strength, kg | Heat Resistant Strength, kg | Strength Retention, % | Adhesive Force, kg |
| 1 | N,N'diglycidil-5,5-diphenyl-hydantoin | 0.5 | 0.94 | 6 | 23.6 | 20.1 | 85 | 20.7 |
| 2 | N,N'—diglycidiluracil | 0.5 | 0.92 | 7 | 23.0 | 18.9 | 82 | 20.1 |
| 3 | N,N'—diglycidil-5,5-diethyl-barbituric acid | 0.5 | 0.89 | 8 | 22.6 | 18.3 | 81 | 19.8 |
| 4 | N,N'—diglycidil-5-methyl-isocyanuric acid | 0.5 | 0.90 | 7 | 22.8 | 18.7 | 82 | 19.8 |
| Comparative Example 1 | — | — | 0.70 | 29 | 18.4 | 11.0 | 60 | 15.2 |
| Compar- | N,N'—diglycidil-5,5-diphenyl- | 0.05 | 0.72 | 20 | 18.6 | 13.2 | 71 | 15.6 |

TABLE 1-continued

| Example Number | Epoxy Compounds Name of Compound | Epoxy Compounds Amount of Addition, Weight % | Drawn Yarn Intrinsic Viscosity | Drawn Yarn (COOH) Grams Equivalent/ $10^6$ Grams | Treated Cord Strength, kg | Treated Cord Heat Resistant Strength, kg | Treated Cord Strength Retention, % | Treated Cord Adhesive Force, kg |
|---|---|---|---|---|---|---|---|---|
| ative Example 2 | hydantoin | | | | | | | |
| Comparative Example 3 | N,N'—diglycidil-5,5-diphenyl-hydantoin | 6.0 | Spinning impossible | | — | — | — | — |
| Comparative Example 4 | N—glycidilphthalimide | 0.5 | 0.68 | 6 | 17.5 | 12.2 | 70 | 15.4 |
| Comparative Example 5 | Denacol EX-221 | 0.5 | 0.67 | 26 | 17.1 | 10.5 | 61 | 14.2 |

We claim:

1. A method of making heat resistant polyester, which polyester is the reaction product of an aromatic dicarboxylic acid and a glycol with 2 to 6 carbon atoms, comprising reacting said polyester with 0.1 to 5 percent by weight of a bifunctional epoxy compound having the following general formula (A) or (B):

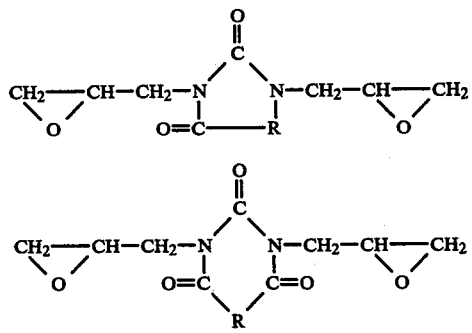

wherein R indicates a divalent organic group, and (A) or (B) has 2 or 3 carbonyl groups adjacent to the nitrogen atom, to reduce the amount of carboxyl end groups to below 15 g equivalent/$10^6$ g polymer.

2. The method of claim 1 wherein the reaction with (A) or (B) is carried out after the intrinsic viscosity of said polyester has reached 0.5 and said reaction takes more than 3 minutes.

3. The method of claim 1 wherein (A) or (B) is selected from the group consisting of:
N,N'-diglycidilhydantoin;
N,N'-diglycidilbenzylidenehydantoin;
N,N'-diglycidil-5,5-diphenylhydantoin;
N,N'-diglycidilpentamethylenehydantoin;
N,N'-diglycidil-5-methyl-5-isobutylhydantoin;
N,N'-diglycidil-5-phenyl-5-ethylhydantoin;
N,N'-diglycidil-5,5-dimethylhydantoin;
N,N'-diglycidil-5-phenyl-5-methylhydantoin;
N,N'-diglycidilfurfurylidenehydantoin;
N,N'-diglycidil-7,9-benzo-5,5-pentamethylenehydantoin;
N,N'-diglycidiluracil;
N,N'-diglycidil-6-methyluracil;
N,N'-diglycidil-5-methyluracil;
N,N'-diglycidil-5-bromouracil;
N,N'-diglycidil-5-iodouracil;
N,N'-diglycidil-5-fluorouracil;
N,N'-diglycidilbarbituric acid;
N,N'-diglycidil-5-methylbarbituric acid;
N,N'-diglycidil-5-ethylbarbituric acid;
N,N'-diglycidil-5-n-butylbarbituric acid;
N,N'-diglycidil-5-isobutylbarbituric acid;
N,N'-diglycidil-5-phenylbarbituric acid;
N,N'-diglycidil-5-chlorobarbituric acid;
N,N'-diglycidil-5-bromobarbituric acid;
N,N'-diglycidil-5,5-dimethylbarbituric acid;
N,N'-diglycidil-5,5-diethylbarbituric acid;
N,N'-diglycidil-5,5-diphenylbarbituric acid;
N,N'-diglycidil-5-methylisocyanuric acid;
N,N'-diglycidil-5-ethylisocyanuric acid;
N,N'-diglycidil-5-n-butylisocyanuric acid;
N,N'-diglycidil-5-isobutylisocyanuric acid;
N,N'-diglycidil-5-phenylisocyanuric acid;
N,N'-diglycidil-5-chloroisocyanuric acid; and
N,N'-diglycidil-5-bromoisocyanuric acid.

4. A polymer of heat resistant polyester, which polyester is the reaction product of an aromatic dicarboxylic acid and a glycol with 2 to 6 carbon atoms, said polyester being reacted with 0.1 to 5 percent by weight of a bifunctional epoxy compound having the following general formula (A) or (B):

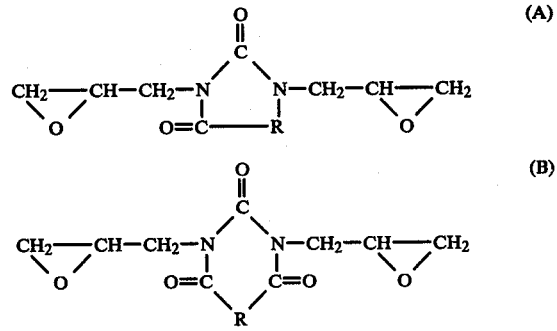

wherein R indicates a divalent organic group and (A) or (B) has 2 or 3 carbonyl groups adjacent to the nitrogen atom to reduce the amount of carboxyl end groups to below 15 g equivalent/$10^6$ g polymer.

5. The polymer of claim 1 wherein (A) or (B) is selected from the group consisting of:
N,N'-diglycidilhydantoin;
N,N'-diglycidilbenzylidenehydantoin;
N,N'-diglycidil-5,5-diphenylhydantoin;
N,N'-diglycidilpentamethylenehydantoin;
N,N'-diglycidil-5-methyl-5-isobutylhydantoin;
N,N'-diglycidil-5-phenyl-5-ethylhydantoin;
N,N'-diglycidil-5,5-dimethylhydantoin;
N,N'-diglycidil-5-phenyl-5-methylhydantoin;

N,N'-diglycidilfurfurylidenehydantoin;
N,N'-diglycidil-7,8-benzo-5,5-pentamethylenehydantoin;
N,N'-diglycidiluracil;
N,N'-diglycidil-6-methyluracil;
N,N'-diglycidil-5-methyluracil;
N,N'-diglycidil-5-bromouracil;
N,N'-diglycidil-5-iodouracil;
N,N'-diglycidil-5-fluorouracil;
N,N'-diglycidilbarbituric acid;
N,N'-diglycidil-5-methylbarbituric acid;
N,N'-diglycidil-5-ethylbarbituric acid;
N,N'-diglycidil-5-n-butylbarbituric acid;
N,N'-diglycidil-5-isobutylbarbituric acid;
N,N'-diglycidil-5-phenylbarbituric acid;
N,N'-diglycidil-5-chlorobarbituric acid;
N,N'-diglycidil-5-bromobarbituric acid;
N,N'-diglycidil-5,5-dimethylbarbituric acid;
N,N'-diglycidil-5,5-diethylbarbituric acid;
N,N'-diglycidil-5,5-diphenylbarbituric acid;
N,N'-diglycidil-5-methylisocyanuric acid;
N,N'-diglycidil-5-ethylisocyanuric acid;
N,N'-diglycidil-5-n-butylisocyanuric acid;
N,N'-diglycidil-5-isobutylisocyanuric acid;
N,N'-diglycidil-5-phenylisocyanuric acid;
N,N'-diglycidil-5-chloroisocyanuric acid; and
N,N'-diglycidil-5-bromoisocyanuric acid.

* * * * *